Nov. 16, 1954 D. T. REESE ET AL 2,694,557
PORTABLE FEED MIXER
Filed Aug. 26, 1952 2 Sheets-Sheet 1
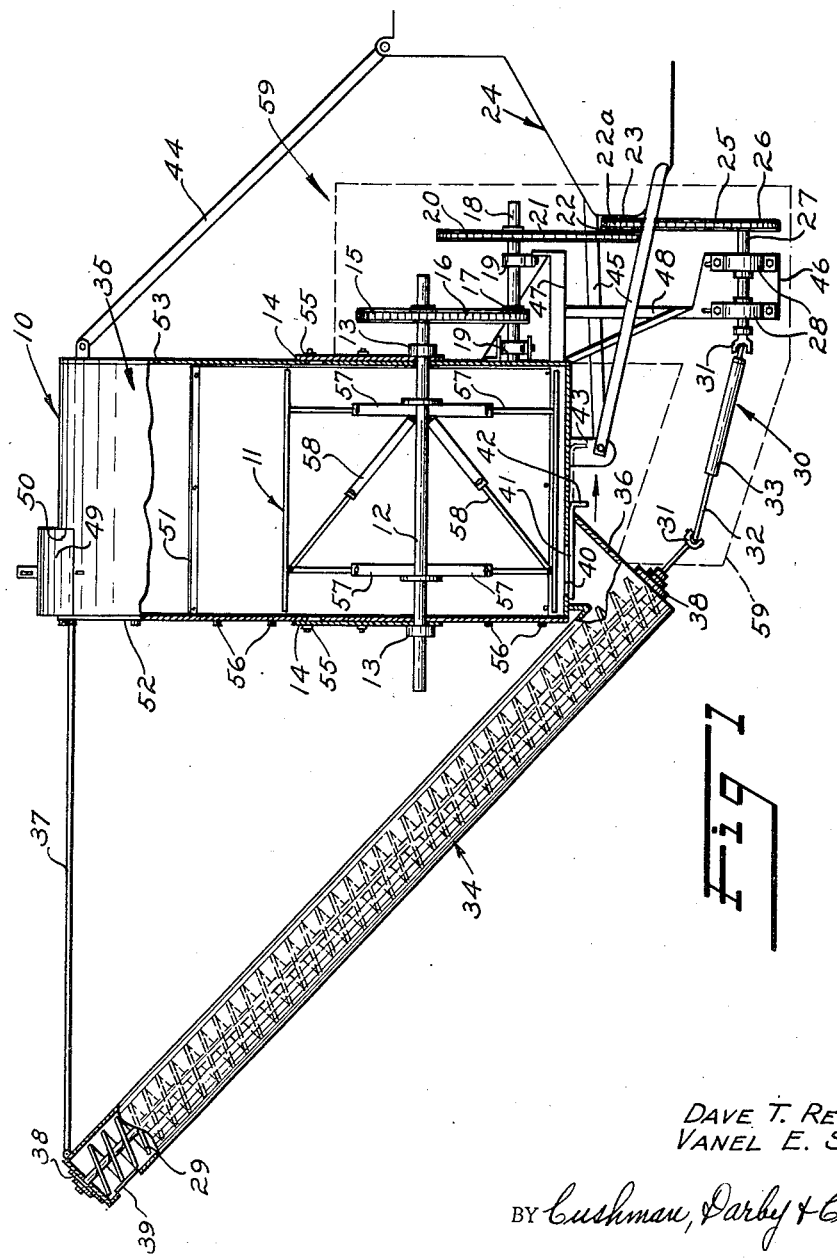
INVENTORS
DAVE T. REESE
VANEL E. STAGGS
BY Cushman, Darby & Cushman
ATTORNEYS

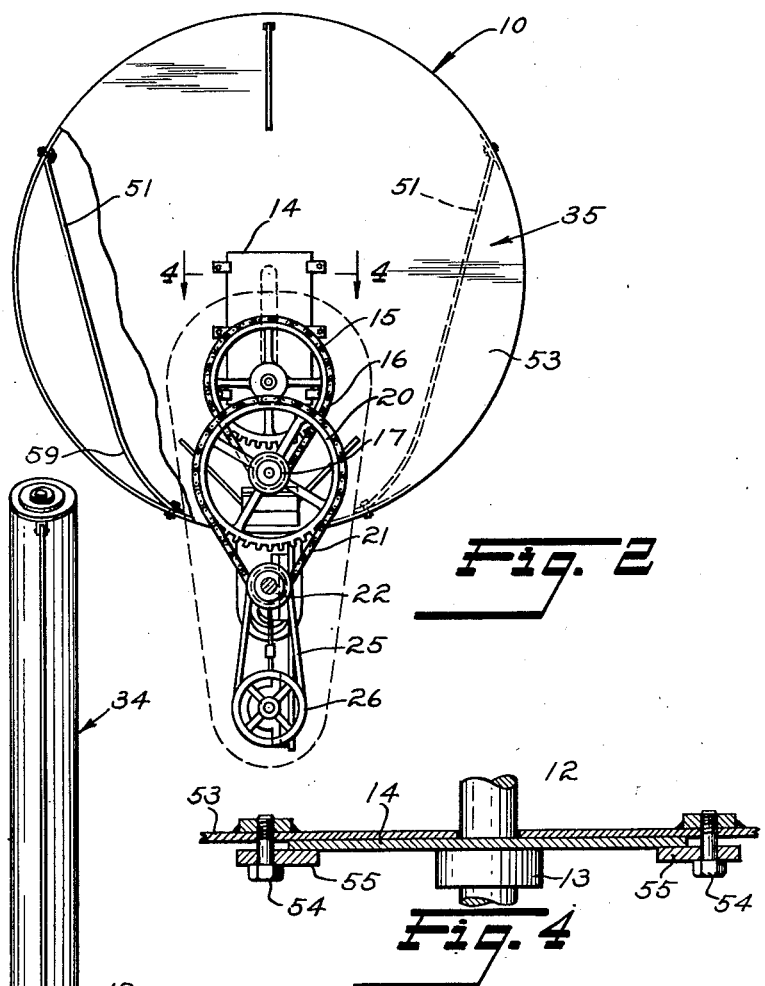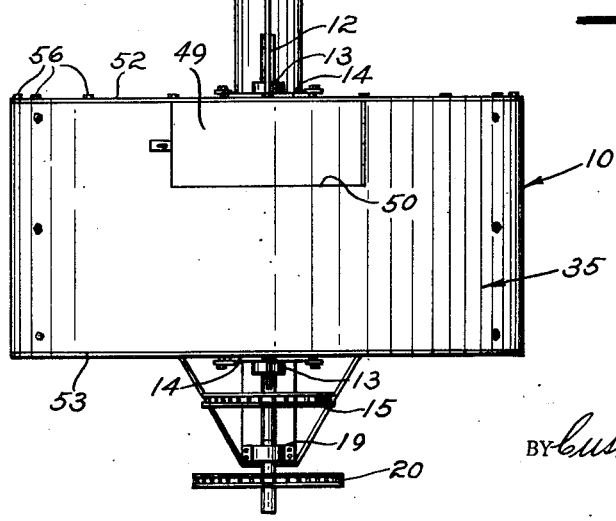

United States Patent Office 2,694,557
Patented Nov. 16, 1954

2,694,557
PORTABLE FEED MIXER

Dave T. Reese and Vanel E. Staggs, Yuma, Ariz.

Application August 26, 1952, Serial No. 306,364

4 Claims. (Cl. 259—46)

This invention relates to mixers, and more particularly to improvements in mixers for comminuted materials such as grains used in feeding livestock. Although portable mixing means adaptable for operation by the power take-off of a tractor are known, these mixers, for the most part, relate to mixing of concrete and are in many ways unsuited for use as feed mixers. Equipment available on the market today is expensive, difficult to maintain, lacking in capacity, utility and general suitability for receiving, mixing, transporting and discharging feed for livestock.

It is an object of our invention to provide an inexpensive mixer which may be easily attached to the rear of a farm tractor.

It is another object of our invention to provide a mixer of adjustable capacity adapted to be operated by the rear power take-off of a farm tractor.

A further object of our invention is to provide a mixer of simple yet rugged construction which is easy to operate, maintain, disassemble and repair.

A still further object of our invention is to provide a mixer having general utility about farms and ranches which is easy to load, unload and transport, and which is easy to adjust and maintain with simple tools available on most farms.

A further important object of our invention is to provide a mixer which will keep feed grain thoroughly mixed while transporting it from storage to livestock feeding stations or between such stations.

A further important object of our invention is to provide a portable mixer which will discharge feed from an elevated position so as to load this feed into the top portion of livestock feeders.

A still further important object of our invention is to provide a portable mixer which is completely enclosed so as to protect a load of feed from the elements while it is being transported from storage bin to feeding stations.

Other objects and advantages of our invention will be apparent during the course of the following description.

In the accompanying drawings, forming a part of this application, and in which like numerals are employed to designate like parts throughout the same:

Figure 1 is a side elevation of our mixer, partially in section to show the mixing paddle;

Figure 2 is a front elevation of our mixer partially in section to show one of the removable interior side plates;

Figure 3 is a top view of our mixer; and

Figure 4 is an enlarged detail of the means for vertically adjusting the mixing paddle.

In the drawings, wherein for the purpose of illustration is shown a preferred embodiment of our invention, the numeral 10 indicates our mixer, wherein extensible mixing paddle 11 is mounted on paddle shaft 12 which rotates in journals 13 secured to paddle-adjusting plates 14, slidably mounted in the end walls 52 and 53 of mixer 10.

Sprocket 15 and chain 16 connect paddle shaft 12 to idler shaft sprocket 17 mounted on idler shaft 18 which, in turn, runs in journals 19 which are mounted on platform 47. Secured to one end of idler shaft 18 is sprocket 20. Chain 21 is driven by pulley 22 fixed to power takeoff shaft 23 in the rear of tractor 24.

Another pulley 22a is also fixed to shaft 23 and drives a chain 25 which engages sprocket 26 mounted on shaft 27 journaled in bearings 28.

A spiral screw conveyor 29 is drivingly connected to shaft 27 by means of propeller shaft 30 which is secured to shaft 27 and conveyor 29 by means of universal joints 31. Shaft 30 is automatically adjustable by means of spline 32 and housing 33. Spiral screw conveyor 29 is enclosed within conveyor housing 34 which is fastened at its lower end to mixing drum 35 by bracket 36 and at its upper end to mixing drum 35 by conveyor brace 37. The ends of screw conveyor 29 are mounted for rotation in bearings 38. Housing 34 has a discharge opening 39 at its upper end for discharging materials conveyed up from the bottom of mixing drum 35 to the top of housing 34. In the bottom of mixing drum 35 is a hatchway 40 and sliding hatch 41, used to regulate the flow of material through hatchway 40 into conveyor housing 34. Hatch 41 is manually operated into the open position by grasping hatch handle 42 and pulling in the direction of the arrow shown in Figure 1. The full-open position of hatchway 40 is obtained when hatch 41 is in the position shown by dotted lines at 43.

Mixer 10 is mounted on, and rearward from tractor 24 by means of drum brace 44 and mixer frame 45 which may be secured to the rear end of a tractor by any conventional fastening means. Bearings 28 are mounted on plate 46 which is suspended from platform 47 by plate arm 48. On the top of drum 35 is a hinged hatch 49 covering a material-receiving hatchway 50. Hence, when hatch 49 is closed, drum 35 will be completely closed, and the contents of drum 35 will be protected from spoilage due to inclement weather.

Bolted to the cylindrical sides of drum 35 are filler plates 51, and bolted to rear plate 52 and front plate 53 by means of adjustable bolts 54, and binding lugs 55 are paddle shaft adjusting plates 14. Rear plate 52 is bolted to drum 35 by bolts 56 so as to be removable in order to gain access to the interior of drum 35 in order to make repairs, adjustments, and to assemble and disassemble interior parts.

In operation, hinged hatch 49 is opened, and sliding hatch 41 is closed. The tractor may then be driven under a loading bin and drum 35 filled with feed through material-receiving hatchway 50. After drum 35 is filled, hatch 49 is closed and power take-off 23 is started causing power take-off pulley 22 to rotate. Chain 21 causes sprocket 20 and idler shaft 18 to rotate which, in turn, causes chain 16 and sprockets 15 and 17 to turn and rotate paddle shaft 12 and paddle 11 secured to paddle shaft 12.

At the same time, power take-off pulley 22 causes chain 25 and sprocket 26 to rotate thereby rotating shaft 27, propeller shaft 30, and spiral conveyor 29.

While the grain is thus being mixed by paddle 11, the tractor carries the mixer out to the first feeding station. Sliding hatch 41 is then placed in the full open position 43, and feed gravitates into the lower portion of spiral conveyor housing 34 where it is carried up through conveyor housing 34 and out opening 39 into a feed bin. After the feed bin is sufficiently full, sliding hatch 41 is returned to the closed position, and while the feed is still being agitated, the mixer is transported to the next feeding station where the loading operation is repeated. This procedure continues until all feeding stations have been loaded or the mixer is emptied and must return for another load.

Since farm tractors vary in size and weight, the particular tractor being used for this chore may tend to tip over backwards if a full load is too heavy for it. Because of this fact, filler plates 51, at the option of the user, may be bolted inside drum 35, as shown in Figure 2, for the purpose of cutting down the volume of the drum and, consequently, the weight of the load carried in the drum. These plates may be adjusted in shape and position so as to provide just the proper drum capacity for the tractor being used. Inasmuch as the lower ends of plates 51 have a curvature of less radius than the drum 35 it is necessary to adjust paddle 11 to conform with this smaller radius. We accomplish this adjustment by making shaft 12 vertically adjustable, and paddle arms 57 and braces 58 adjustably extensible.

These adjustments are made as follows: When filler plates 51 are placed in drum 35, paddle arms 57 and braces 58 are shortened until arms 57 are equal in length to the radius of the curvature 59 of plates 51. Bolts 54 are then loosened and plates 14 are lowered, thus lowering shaft 12 and paddle 11 until paddle arms 57 in rotating just clear plates 51. Bolts 54 and lugs 55 are then tightened down on plates 14 which lock shaft 12 and paddle 11 in place. A suitable number of links from chain 16 must then be removed to complete the adjustment.

It is recognized that exposed rotating chains and sprockets are a source of danger to farm hands working around such moving parts, and, therefore, a suitable protecting sheathing, shown by dotted lines 59, may be easily secured to drum 35 and tractor 24 to encase all such points of danger.

It is to be understood that the form of our invention, herewith shown and described, is to be taken as a preferred example of the same, and that various changes in the shape, size and arrangement of parts may be resorted to, without departing from the spirit of our invention, or the scope of the subjoined claims.

We claim:

1. A portable grain mixer for attachment to a tractor having a power take-off comprising a cylindrically shaped horizontally disposed weatherproof mixing container, a material receiving hatch in the top of said container, a hand regulated material discharge hatch in the bottom of said container, a mixing paddle and shaft mounted for rotation in said container on an axis parallel to the axis of said container, an upwardly extending spiral conveyor disposed to convey materials from the bottom of said container upwardly to the top of said conveyor, pulley and belt means for drivingly connecting said paddle and said spiral conveyor to said power take-off, and means for volumetric adjustment of said container and lineal adjustment of said paddles whereby the capacity of said mixer may be accommodated to the size of the transporting tractor, the volumetric adjustment means of said container being arranged with respect to the paddles so that in all linear adjustments thereof, the free ends of the paddles will pass in proximity to the volumetric adjustment means.

2. The device set forth in claim 1 wherein said adjustment means comprises a liner having a curved portion adjacent said container of smaller radius than said container, said liner being detachably secured to said container, and a mixing paddle radially and vertically adjustable whereby said paddle is adaptable to rotate within liners of different radii.

3. A portable material mixer for attachment to a tractor having a power take-off comprising a container defining a weatherproof mixing chamber, a material receiving hatch in the top of said container, a discharge hatchway in the bottom of said container, a substantially horizontally disposed shaft extending within said chamber, a plurality of circumferentially arranged paddles carried by said shaft within said chamber, means for adjusting said paddles with respect to said shaft so as to vary the distance between the axis of said shaft and the outer ends of said paddles, means for vertically adjusting said shaft in accordance with the adjustment of said paddles whereby the ends of the latter may pass in close proximity to said discharge hatchway, means for volumetric adjustment of said container in accordance with the adjustment of said shaft and said paddles, whereby the capacity of said mixer may be accommodated to the size of the transporting tractor, and means for drivingly connecting said shaft to said power take-off.

4. The device set forth in claim 3 including an upwardly extending conveyor disposed to convey material from the bottom of said container upwardly to the top of said conveyor, said conveyor being enclosed by a housing having a downwardly directed discharge opening formed in the upper end thereof whereby material may be transported in said mixer during inclement weather without damage.

References Cited in the file of this patent

UNITED STATES PATENTS

| Number | Name | Date |
|---|---|---|
| 381,455 | Woerz | Apr. 17, 1888 |
| 752,646 | Boughton | Feb. 23, 1904 |
| 1,198,900 | Eggert | Sept. 19, 1916 |
| 1,694,442 | Gustafson | Dec. 11, 1928 |
| 2,532,518 | Scott | Dec. 5, 1950 |
| 2,537,202 | Bohre | Jan. 9, 1951 |